United States Patent
Chang

(10) Patent No.: US 9,718,308 B1
(45) Date of Patent: Aug. 1, 2017

(54) AIR CELL CASTOR

(71) Applicant: Wen-Chen Chang, Changhua (TW)

(72) Inventor: Wen-Chen Chang, Changhua (TW)

(*) Notice: Subject to any disclaimer, the term of this patent is extended or adjusted under 35 U.S.C. 154(b) by 0 days.

(21) Appl. No.: 14/994,176

(22) Filed: Jan. 13, 2016

(51) Int. Cl.
*B60B 33/00* (2006.01)
*A45C 5/14* (2006.01)

(52) U.S. Cl.
CPC ............ *B60B 33/0028* (2013.01); *A45C 5/14* (2013.01); *B60B 33/0042* (2013.01); *B60B 33/0044* (2013.01); *B60B 33/0049* (2013.01); *B60B 33/0057* (2013.01); *B60B 33/0068* (2013.01); *B60B 2200/45* (2013.01); *B60B 2310/204* (2013.01); *B60B 2360/324* (2013.01); *B60B 2900/111* (2013.01); *B60B 2900/133* (2013.01); *B60B 2900/212* (2013.01); *B60B 2900/313* (2013.01); *B60B 2900/321* (2013.01); *Y10T 16/184* (2015.01)

(58) Field of Classification Search
CPC ............ B60B 33/0028; B60B 33/0042; B60B 33/0068; B60B 33/0049; B60B 33/0044; B60B 33/0057; B60B 2900/131; B60B 2900/111; B60B 2900/321; B60B 2900/212; B60B 2900/313; B60B 2360/324; B60B 2200/45; B60B 2310/204; A45C 5/14; Y10T 16/18; Y10T 16/184; Y10T 16/1847; Y10T 16/1853; Y10T 16/1857; B62B 7/04
USPC .......... 16/45–48, 18 R; 190/18 A; 280/47.38
See application file for complete search history.

(56) References Cited

U.S. PATENT DOCUMENTS

| | | | | |
|---|---|---|---|---|
| 1,483,740 A * | 2/1924 | Montgomery | ............ | B60B 3/08 16/45 |
| 2,596,578 A * | 5/1952 | McIntyre | ............... | A45C 5/146 16/18 R |
| 3,214,785 A * | 11/1965 | Chroust | .................. | B60B 19/14 16/18 R |
| 4,559,669 A * | 12/1985 | Bonzer | ................. | B60B 33/045 16/44 |
| 5,581,843 A * | 12/1996 | Purnell | ..................... | B62B 9/18 16/35 R |
| D407,673 S * | 4/1999 | Kiser | ........................... | D12/569 |
| 6,076,641 A * | 6/2000 | Kinzer | ..................... | A45C 5/14 16/18 CG |
| 6,499,749 B2 * | 12/2002 | Hsia | ........................ | B60B 1/006 152/415 |
| 8,678,404 B2 * | 3/2014 | Chaudeurge | ........ | B60B 33/0005 16/45 |
| 2012/0233809 A1 * | 9/2012 | Lee | ..................... | B60B 33/0039 16/45 |

(Continued)

Primary Examiner — William Miller
(74) Attorney, Agent, or Firm — Alan D. Kamrath; Kamrath IP Lawfirm, P.A.

(57) ABSTRACT

A castor includes a wheel support and at least one roller mounted on the wheel support. The at least one roller has a peripheral portion provided with a hollow air chamber which is provided with a plurality of hollow air columns. One of the hollow air columns is provided with an air inlet. The at least one roller is made of soft material that is made by a blow molding operation. The soft material is initially made into a tubular blank by a blow molding machine. A gas is then filled into the soft material to blow and shape the soft material in a die at a high temperature to form the at least one roller. The at least one roller is then stripped from the die.

4 Claims, 10 Drawing Sheets

(56) References Cited

U.S. PATENT DOCUMENTS

2015/0113766 A1* 4/2015 Hou .................. A45C 5/14
                                                    16/45
2015/0352899 A1* 12/2015 Morin ............... B60B 3/001
                                                    280/79.2

\* cited by examiner

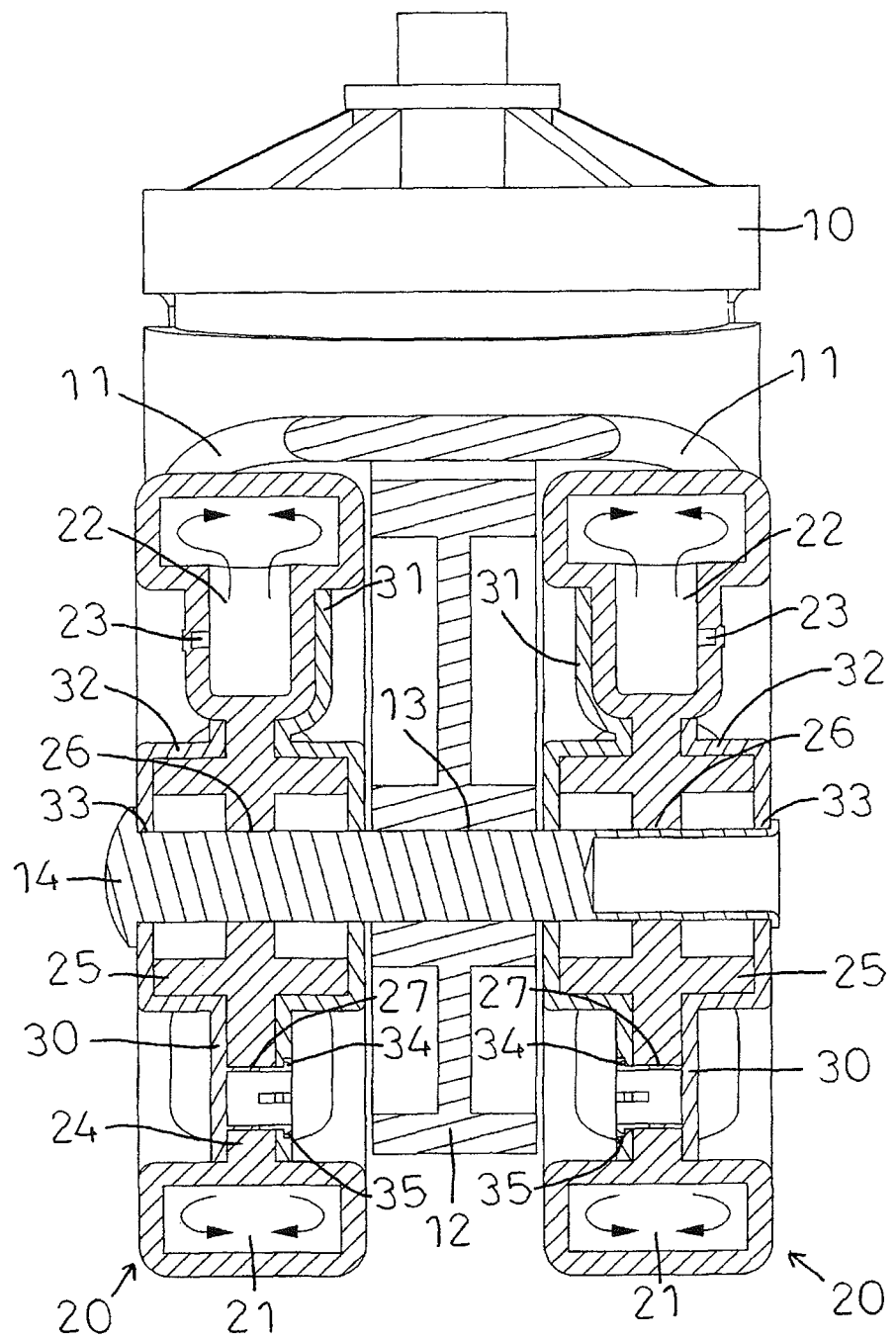
FIG·10

AIR CELL CASTOR

BACKGROUND OF THE INVENTION

1. Field of the Invention

The present invention relates to a castor and, more particularly, to an air cell castor for a suitcase.

2. Description of the Related Art

A castor for a suitcase is made of a solid plastic material. However, the conventional castor has a heavier weight. In addition, the conventional castor does not have a shock-absorbing buffering function. Further, the conventional castor is not wear resistant and does not have a heatproof function. Further, the conventional castor will produce disturbing noise during movement.

BRIEF SUMMARY OF THE INVENTION

In accordance with the present invention, there is provided a castor comprising a wheel support, at least one roller mounted on the wheel support, and a shaft extending through the wheel support and the at least one roller so that the at least one roller is rotatable freely on the wheel support. The at least one roller has a peripheral portion provided with a hollow air chamber having an annular arrangement. The hollow air chamber has an inner diameter provided with a plurality of hollow air columns which are arranged in a radiating manner and are equally distant from each other. One of the hollow air columns is provided with an air inlet. The at least one roller has an inner portion provided with a circumferential face which has a center provided with a seat which has a center provided with a shaft hole pivotally mounted on the shaft. The seat has a hollow cylindrical shape and extends outward. The at least one roller is made of soft material that is made by a blow molding operation. The soft material is PU (polyurethane) with a specific weight of 95 to 115. The soft material is initially made into a tubular blank by a blow molding machine. A gas is then filled into the soft material to blow and shape the soft material in a die at a high temperature to form the at least one roller. The at least one roller is then stripped from the die. The at least one roller is shaped rapidly when the gas is filled into the air inlet.

According to the primary advantage of the present invention, the castor has a shock-absorbing buffering function.

According to another advantage of the present invention, the castor is wear resistant and has a heatproof function.

According to a further advantage of the present invention, the castor will not produce noise during movement.

According to a further advantage of the present invention, the castor has a light weight.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 10 is a cross-sectional view of the castor as shown in FIG. 8.

DETAILED DESCRIPTION OF THE INVENTION

Figure 1:
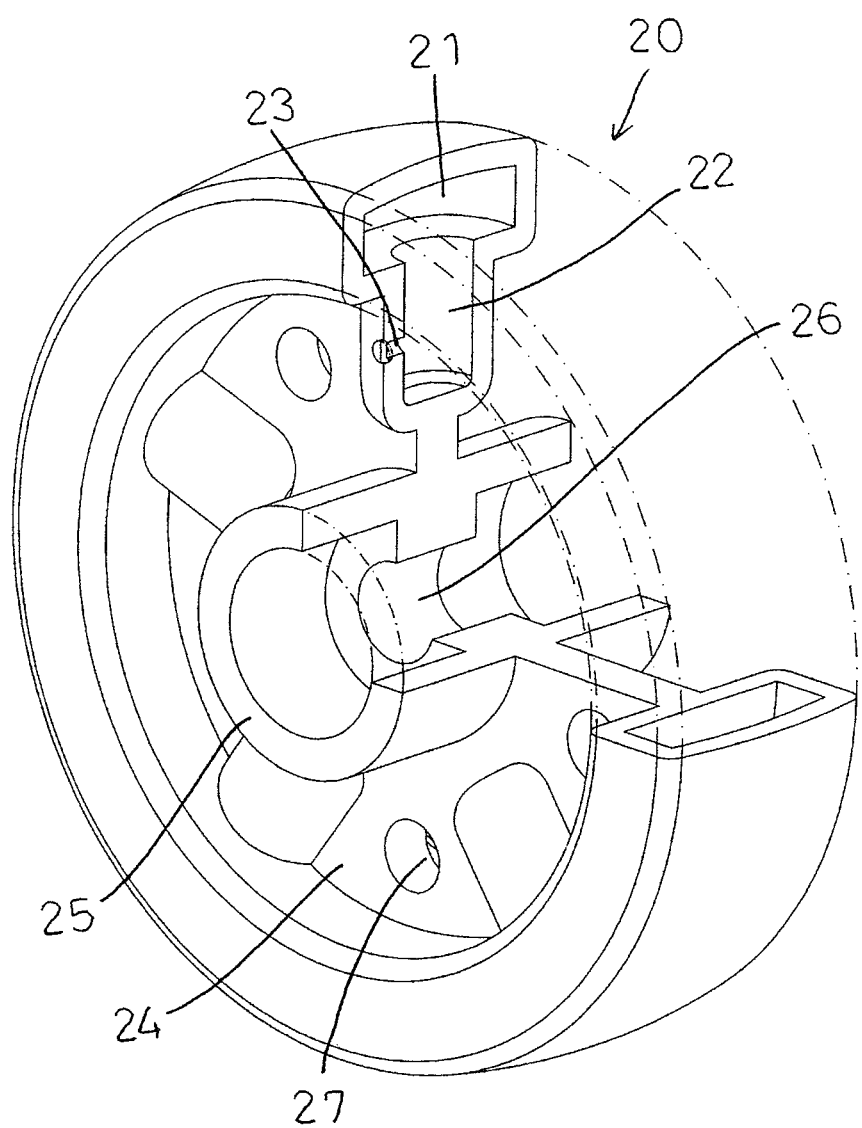
FIG. 1 is a perspective cross-sectional view of a roller of a castor in accordance with the first preferred embodiment of the present invention.
Figure 2:
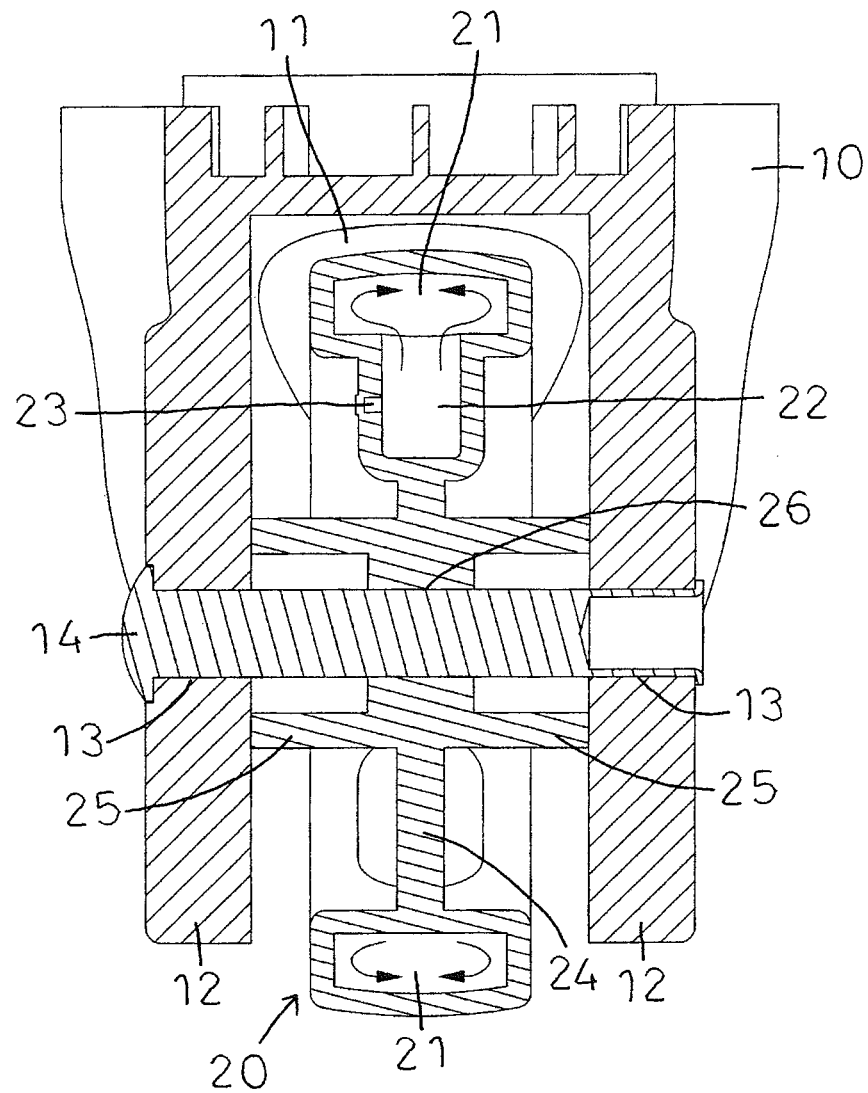
FIG. 2 is a cross-sectional view of the castor in accordance with the first preferred embodiment of the present invention.

Referring to the drawings and initially to FIGS. 1 and 2, a castor in accordance with the preferred embodiment of the present invention comprises a wheel support 10, at least one roller 20 mounted on the wheel support 10, and a shaft 14 extending through the wheel support 10 and the at least one roller 20 so that the at least one roller 20 is rotatable freely on the wheel support 10.

The at least one roller 20 has a peripheral portion provided with a hollow air chamber 21 having an annular arrangement. The hollow air chamber 21 has an inner diameter provided with a plurality of hollow air columns 22 which are arranged in a radiating manner and are equally distant from each other. One of the hollow air columns 22 has a side provided with an air inlet 23. The at least one roller 20 has an inner portion provided with a circumferential face 24 which has a center provided with a seat 25 which has a center provided with a shaft hole 26 pivotally mounted on the shaft 14. The seat 25 has a hollow cylindrical shape and extends outward.

In fabrication, the at least one roller 20 is made of soft material that is made by a blow (or blow extruding) molding operation. The soft material is PU (polyurethane) with a specific weight of 95 to 115. The soft material is initially made into a tubular blank by a blow molding machine. A gas (such as nitrogen which is an inert gas) is then filled into the soft material to blow and shape the soft material in a die at a high temperature to form the at least one roller 20. The at least one roller 20 is then stripped from the die. The at least one roller 20 is shaped rapidly when the gas is filled into the air inlet 23, and the air inlet 23 is sealed after the at least one roller 20 is stripped from the die. The hollow air chamber 21 and the hollow air columns 22 are pressed when the gas is blown into the at least one roller 20 so as to seal the air inlet 23. The air inlet 23 has two sealing manners. In practice, the air inlet 23 is softened and sealed when the at least one roller 20 is stripped from the die. Alternatively, the air inlet 23 is heated and sealed by an electrothermal bar after the at least one roller 20 is stripped from the die.

The wheel support 10 is provided with two ears 12 with a receiving space 11 being defined between the two ears 12, and the at least one roller 20 is received in the receiving space 11 and disposed between the two ears 12. Each of the two ears 12 has a center provided with a pivot hole 13, and the shaft 14 extends through the pivot hole 13 of each of the two ears 12.

Figure 3:
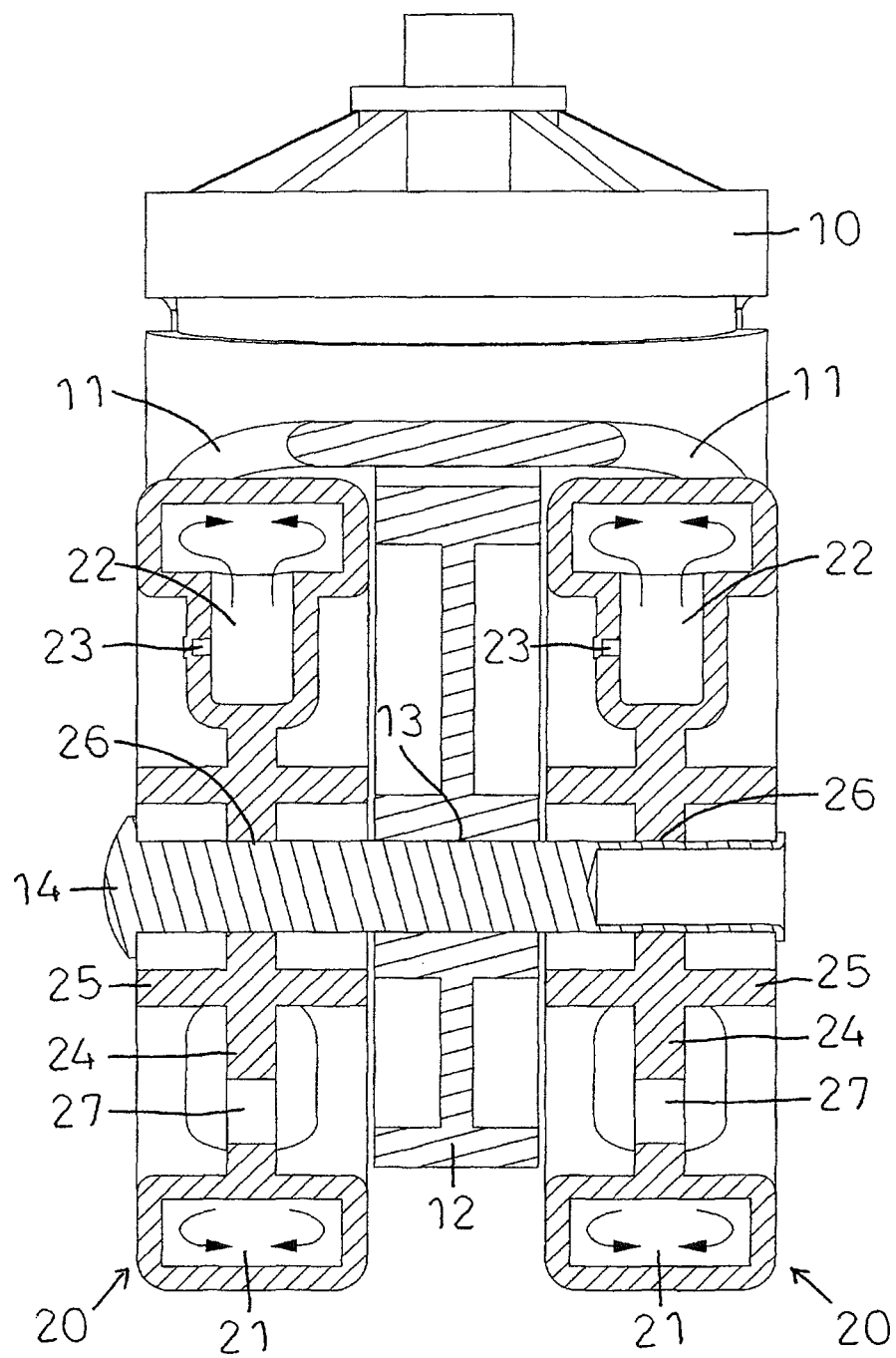
FIG. 3 is a cross-sectional view of a castor in accordance with the second preferred embodiment of the present invention.
Figure 4:
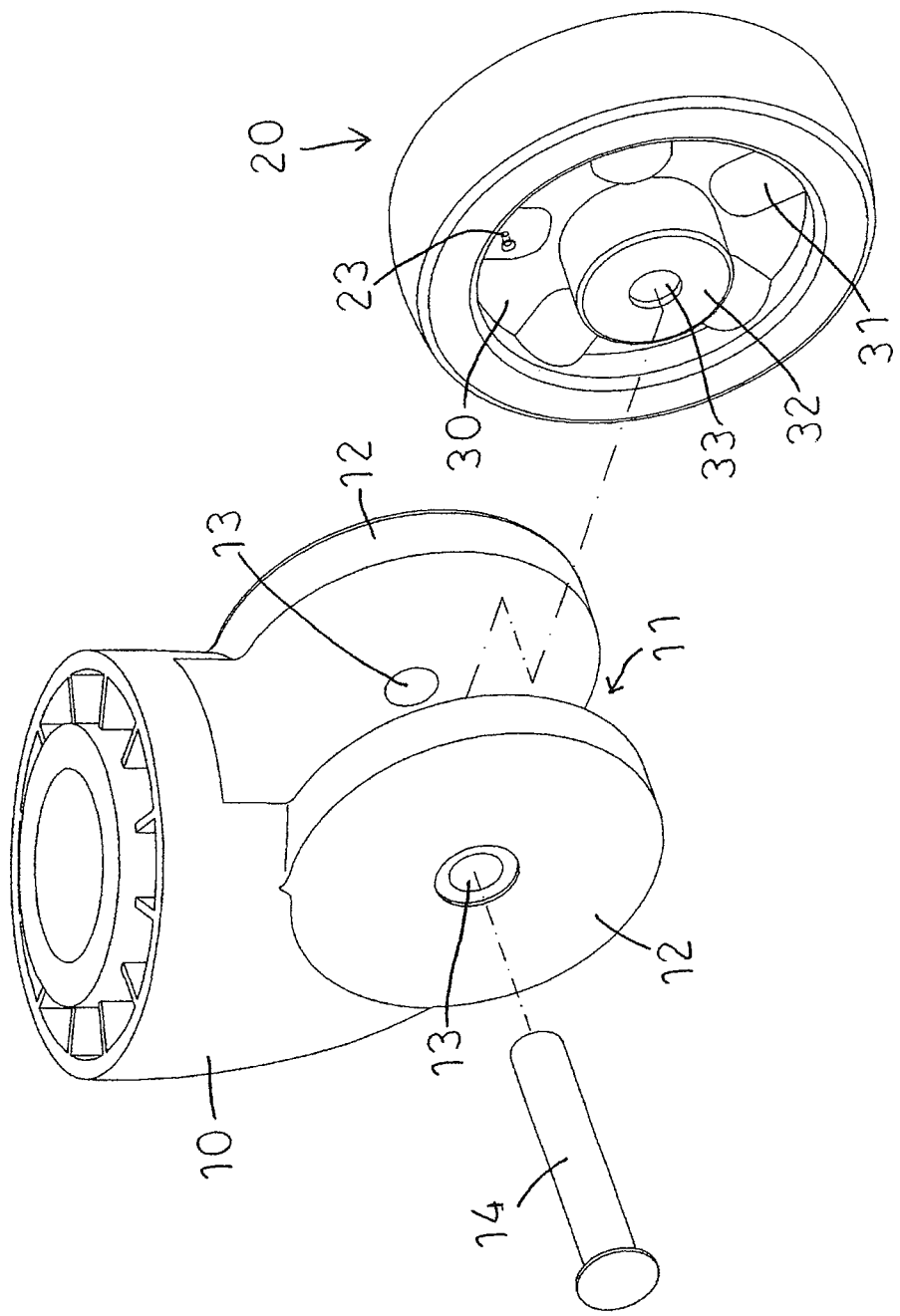
FIG. 4 is an exploded perspective view of a castor in accordance with the third preferred embodiment of the present invention.
Figure 5:
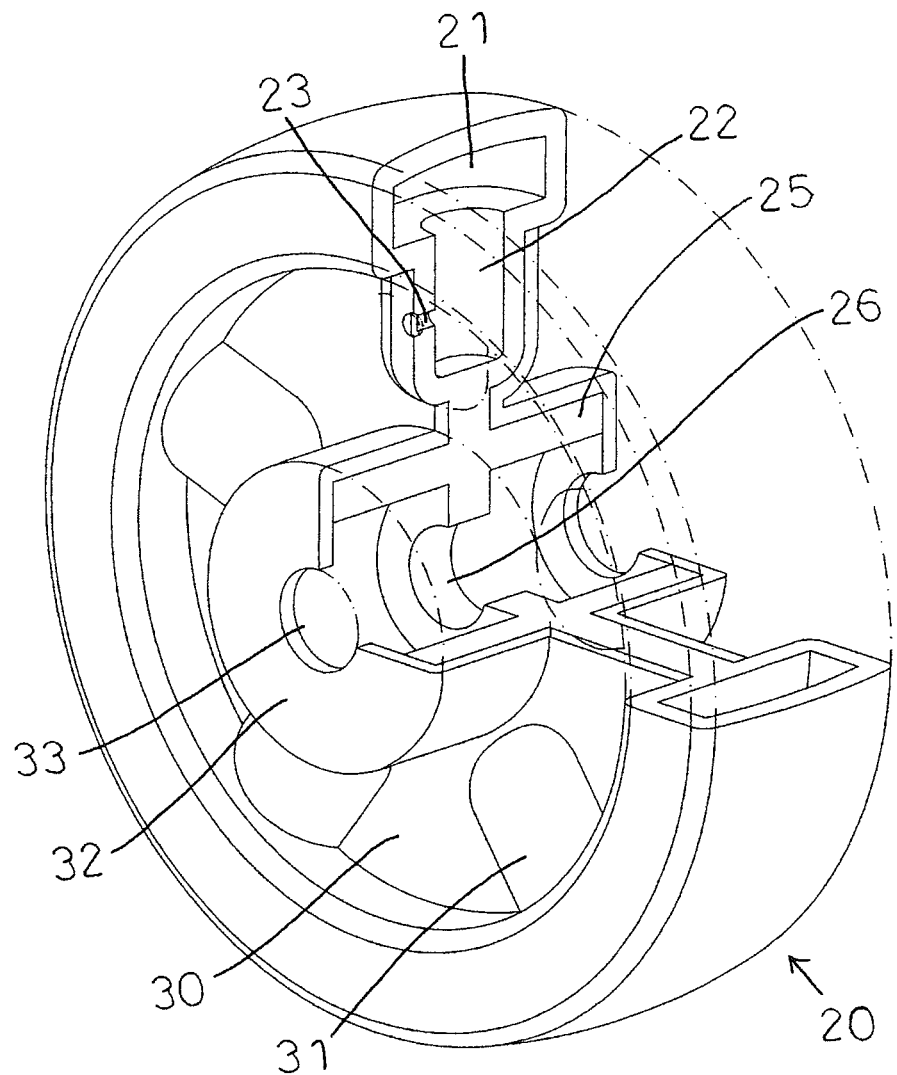
FIG. 5 is a locally cross-sectional view of the castor as shown in FIG. 4.
Figure 6:
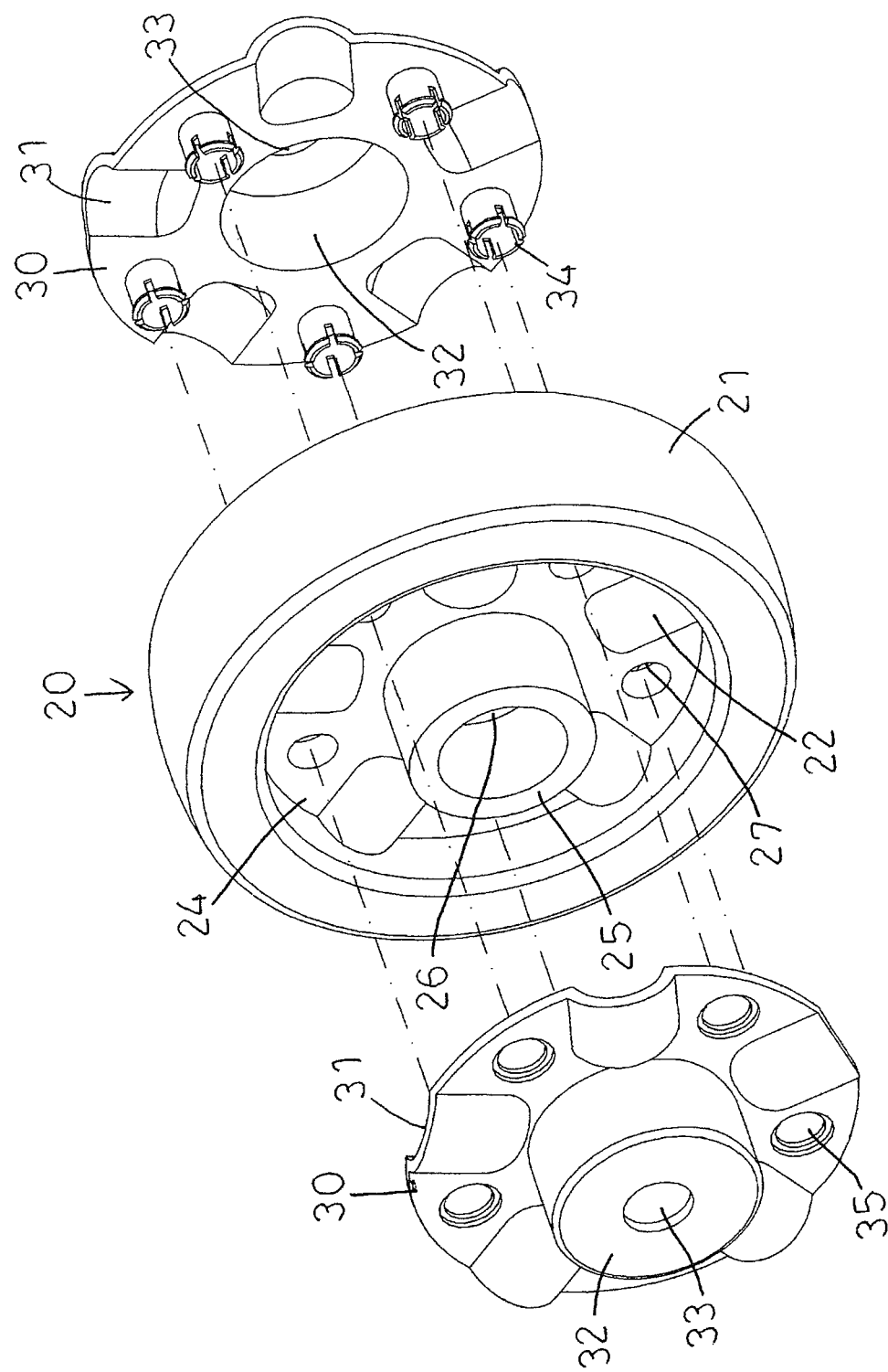
FIG. 6 is a partially exploded perspective view of the castor as shown in FIG. 4.
Figure 7:
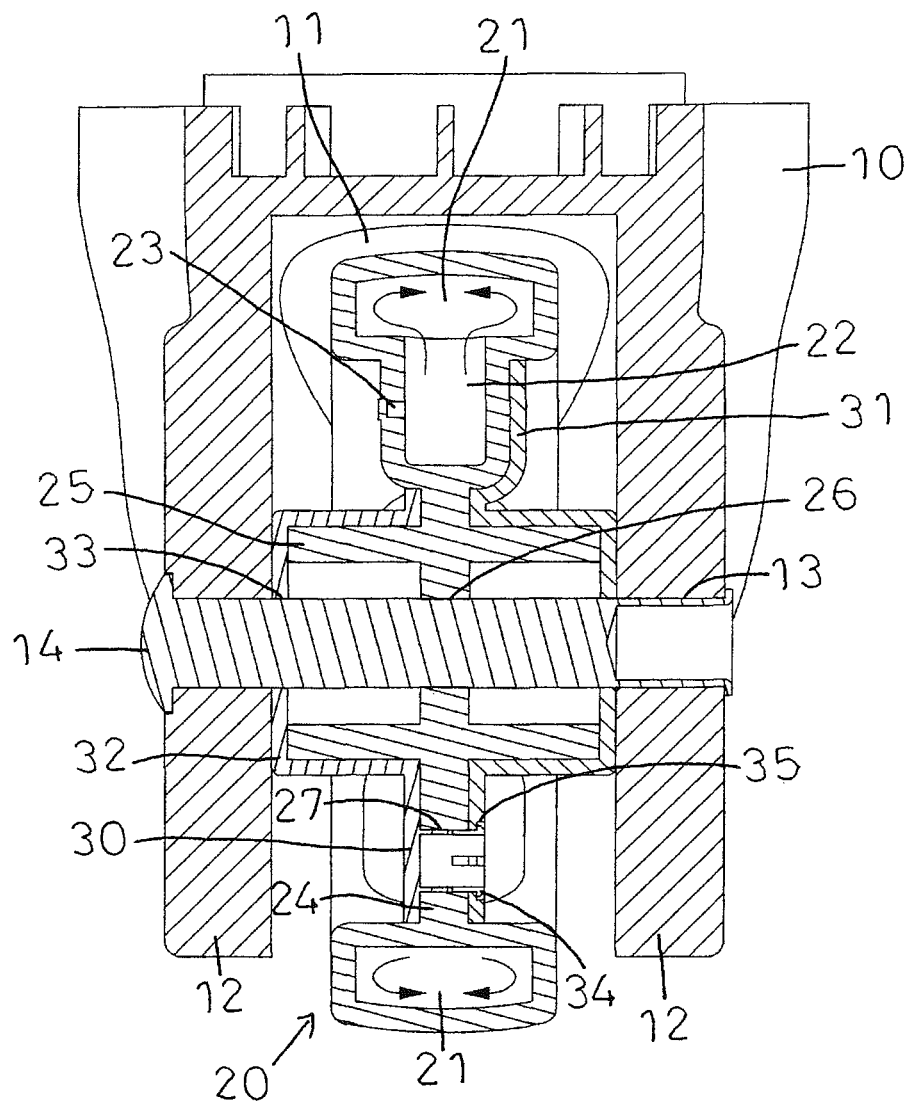
FIG. 7 is a cross-sectional assembly view of the castor as shown in FIG. 4.

Referring to FIG. 3, the castor comprises two rollers 20 mounted on the wheel support 10. The wheel support 10 is provided with two receiving spaces 11 and an ear 12 between the two receiving spaces 11. The ear 12 has a center provided with a pivot hole 13, and the shaft 14 extends through the pivot hole 13 of each of the ear 12. The two rollers 20 are received and rotatable freely in the two receiving spaces 11, and the ear 12 is sandwiched between the two rollers 20.

Referring to FIGS. 4-7, the castor further comprises two decorative plates 30 mounted on the at least one roller 20. The at least one roller 20 is located between the two decorative plates 30. The circumferential face 24 of the at least one roller 20 is provided with a plurality of through holes 27. Each of the two decorative plates 30 has a shape and a size the same as that of the circumferential face 24. Each of the two decorative plates 30 is provided with a plurality of recessed portions 31 covering the hollow air columns 22. Each of the two decorative plates 30 is provided with a cover 32 mounted on the seat 25. The cover 32 of each of the two decorative plates 30 is provided with an aperture 33 aligning with the shaft hole 26 to allow passage of the shaft 14. One of the two decorative plates 30 is provided with a plurality of countersinks 35. The other one of the two decorative plates 30 is provided with a plurality of flexible locking pillars 34 extending through the through holes 27 of the at least one roller 20 and locked in the countersinks 35 of one of the two decorative plates 30 so that the two decorative plates 30 are combined together, and the at least one roller 20 is clamped between the two decorative plates 30.

Figure 8:
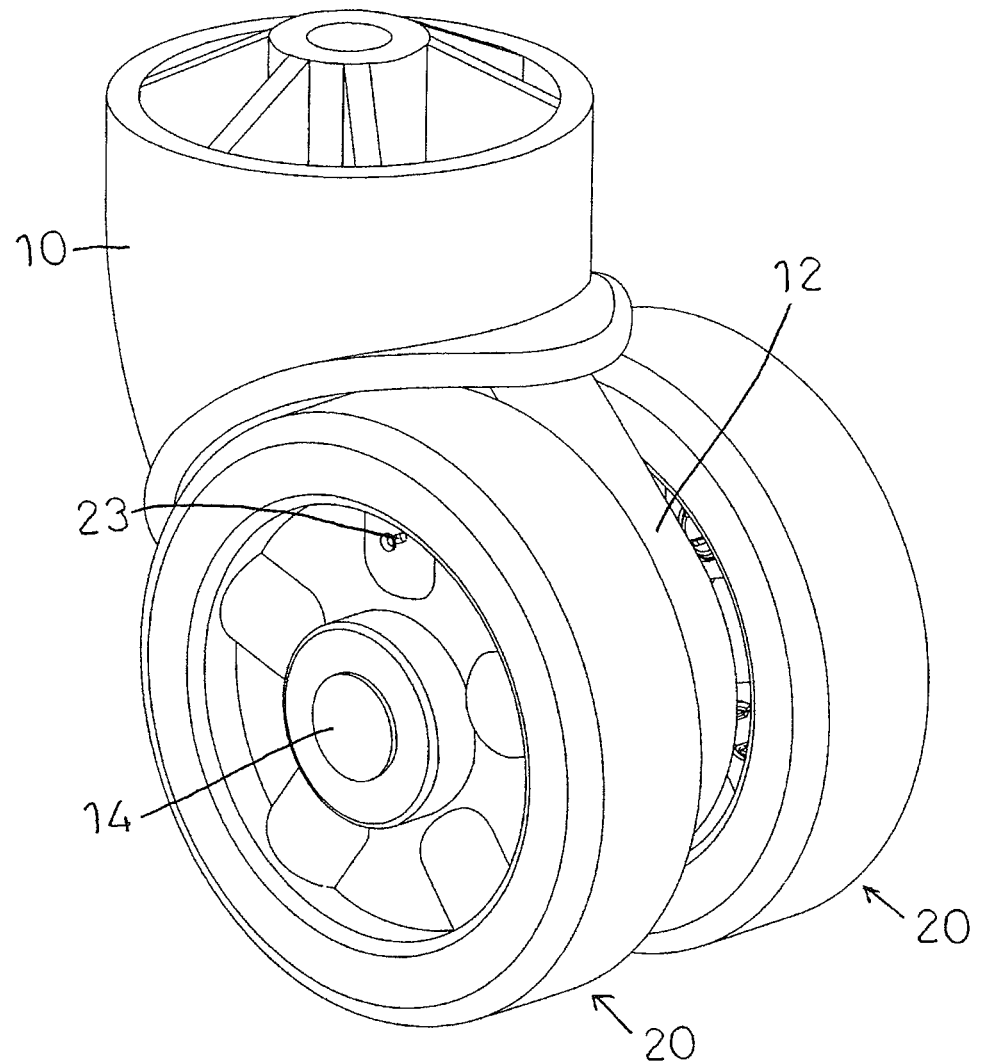
FIG. 8 is a perspective view of a castor in accordance with the fourth preferred embodiment of the present invention.
Figure 9:
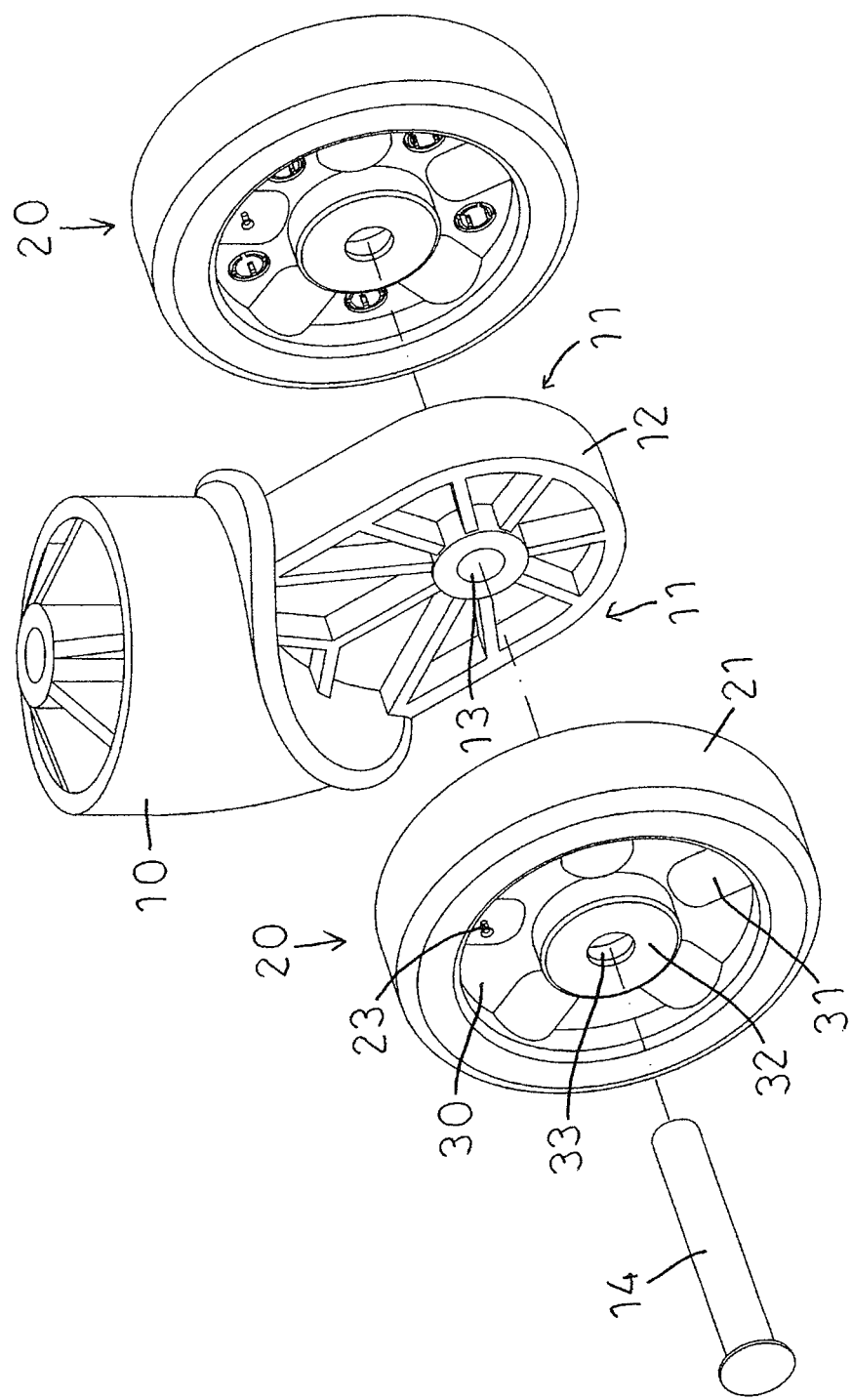
FIG. 9 is an exploded perspective view of the castor as shown in FIG. 8.

Referring to FIGS. 8-10, each of the two rollers 20 is clamped between the two decorative plates 30.

Accordingly, the castor has a shock-absorbing buffering function. In addition, the castor is wear resistant and has a heatproof function. Further, the castor will not produce noise during movement. Further, the castor has a light weight.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor comprising:
a wheel support;
at least one roller mounted on the wheel support; and
a shaft extending through the wheel support and the at least one roller so that the at least one roller is rotatable freely on the wheel support;
wherein:
the at least one roller has a peripheral portion provided with a hollow air chamber having an annular arrangement;
the hollow air chamber has an inner diameter provided with a plurality of hollow air columns which are arranged in a radiating manner and are equally distant from each other;
one of the plurality of hollow air columns is provided with an air inlet;
the at least one roller has an inner portion provided with a circumferential face which has a center provided with a seat which has a center provided with a shaft hole pivotally mounted on the shaft;
the seat has a hollow cylindrical shape and extends outward;
the at least one roller is made of soft material;
the soft material is PU (polyurethane) with a specific weight of 95 to 115; and
a gas is filled into the soft material via the air inlet to shape the soft material to form the at least one roller.

2. The castor of claim 1, further comprising two decorative plates mounted on the at least one roller; wherein:
the circumferential face of the at least one roller is provided with a plurality of through holes;
each of the two decorative plates has a shape and a size the same as that of the circumferential face;
each of the two decorative plates is provided with a plurality of recessed portions covering the plurality of hollow air columns;
each of the two decorative plates is provided with a cover mounted on the seat;
the cover of each of the two decorative plates is provided with an aperture aligning with the shaft hole to allow passage of the shaft;
one of the two decorative plates is provided with a plurality of countersinks; and
another one of the two decorative plates is provided with a plurality of flexible locking pillars extending through the plurality of through holes of the at least one roller and locked in the plurality of countersinks of the one of the two decorative plates so that the two decorative plates are combined together, and the at least one roller is clamped between the two decorative plates.

3. The castor of claim 1, wherein:
the wheel support is provided with two ears with a receiving space being defined between the two ears;
the at least one roller is received in the receiving space and disposed between the two ears;
each of the two ears has a center provided with a pivot hole; and
the shaft extends through the pivot hole of each of the two ears.

4. The castor of claim 1, wherein:
the at least one roller comprises two rollers mounted on the wheel support;
the wheel support is provided with two receiving spaces and an ear between the two receiving spaces;
the ear has a center provided with a pivot hole;
the shaft extends through the pivot hole of the ear;
the two rollers are received and rotatable freely in the two receiving spaces; and
the ear is sandwiched between the two rollers.

\* \* \* \* \*